2 Sheets—Sheet 1.

W. R. BAKER.
HARVESTER.

No. 174,755. Patented March 14, 1876.

WITNESSES
Wm A Skinkle
Wm J Peyton

INVENTOR
William R. Baker.
By his Attorney
W. D. Baldwin

N. PETERS, PHOTO-LITHOGRAPHER, WASHINGTON, D.C.

W. R. BAKER.
HARVESTER.
No. 174,755.
Patented March 14, 1876.
2 Sheets—Sheet 2.
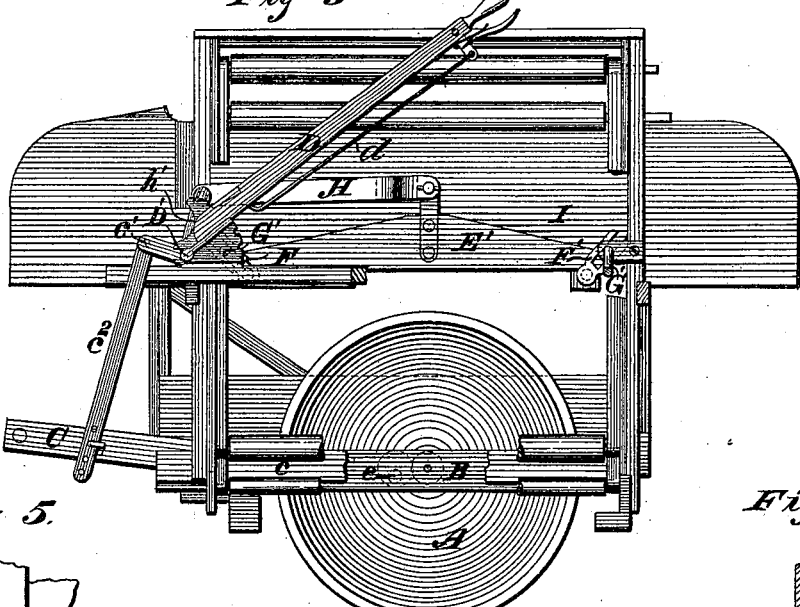
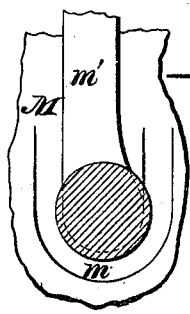
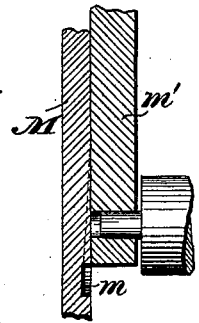
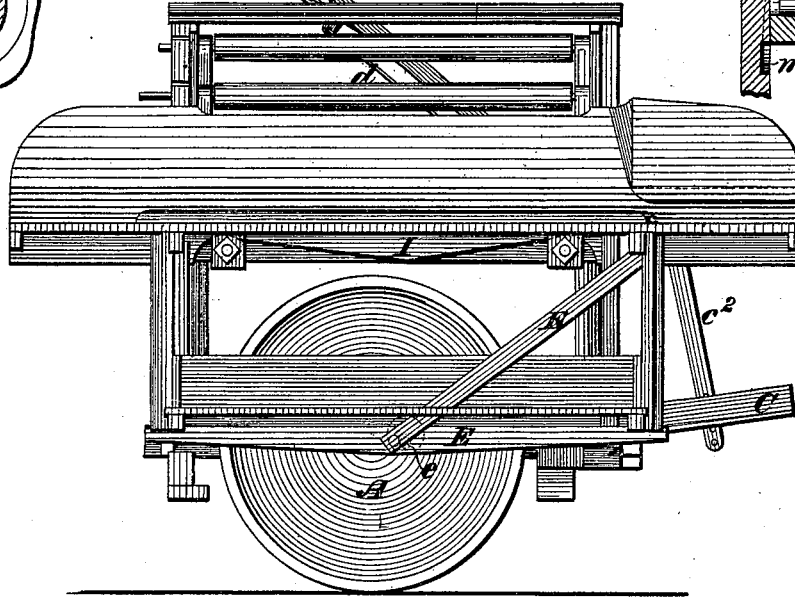
WITNESSES
INVENTOR
William R. Baker.
By his Attorney

UNITED STATES PATENT OFFICE.

WILLIAM R. BAKER, OF CHICAGO, ILL., ASSIGNOR TO CYRUS H. McCORMICK, LEANDER J. McCORMICK, AND ROBERT H. McCORMICK, OF SAME PLACE.

IMPROVEMENT IN HARVESTERS.

Specification forming part of Letters Patent No. 174,755, dated March 14, 1876; application filed January 26, 1876.

*To all whom it may concern:*

Be it known that I, WILLIAM R. BAKER, of Chicago, in the county of Cook and State of Illinois, have invented certain new and useful Improvements in Hand-Binding Harvesters, of which the following is a specification:

My invention relates to that class of harvesters in which the grain is bound by persons riding on the machine.

The object of the first part of my invention is to render the binders' stand and table adjustable relatively to the main frame, so as to keep the table and stand aforesaid substantially horizontal; and my invention constitutes an improvement on the harvester shown in United States Letters Patent No. 170,388, granted November 23, 1875, to Leander J. McCormick.

The devices which constitute the subject-matter hereinafter claimed are especially adapted to a fully-organized harvester, such as built by C. H. and L. J. McCormick, of Chicago, Illinois.

The second part of my invention relates to the apparatus for delivering the cut grain to the binders. Its object is to compensate the tendency of the elevating-aprons to work sidewise; to which end my improvements consist in forming grooves in the elevator-frame around the elevator-rollers, in which the ends of the slats of the elevator-apron may run, and thus avoid friction, while the aprons are kept in their true position by the central portion of the guide-boards, as hereinafter more fully explained.

The accompanying drawings show all my improvements as embodied in one machine; but, obviously, one may be used without the others, and in machines differing in construction from that of the one herein shown.

Figure 1:
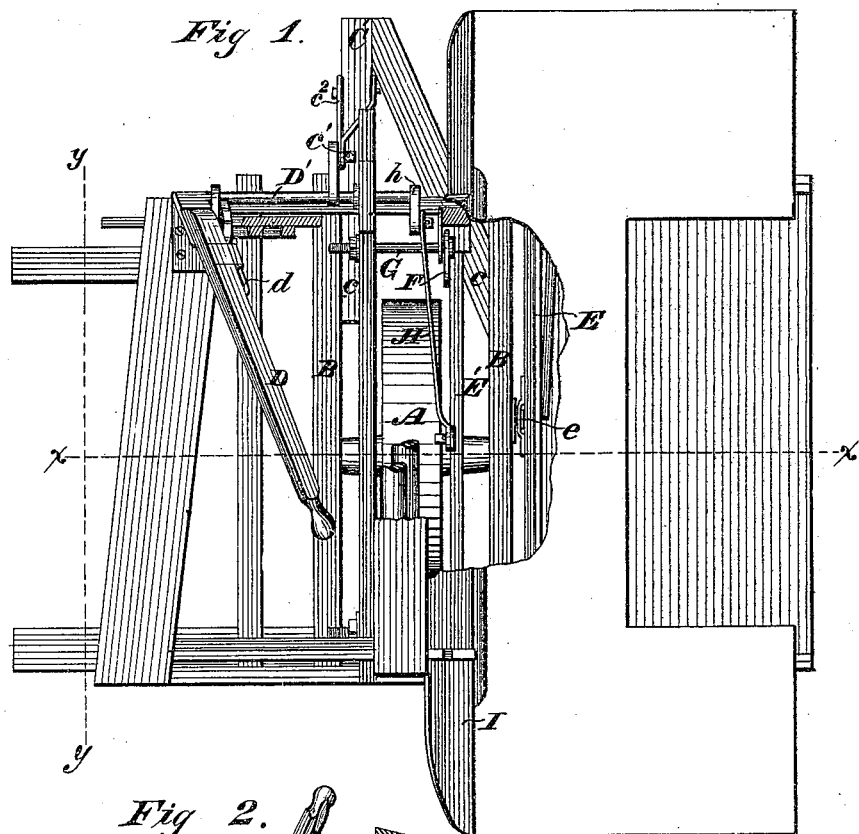
Figure 2:
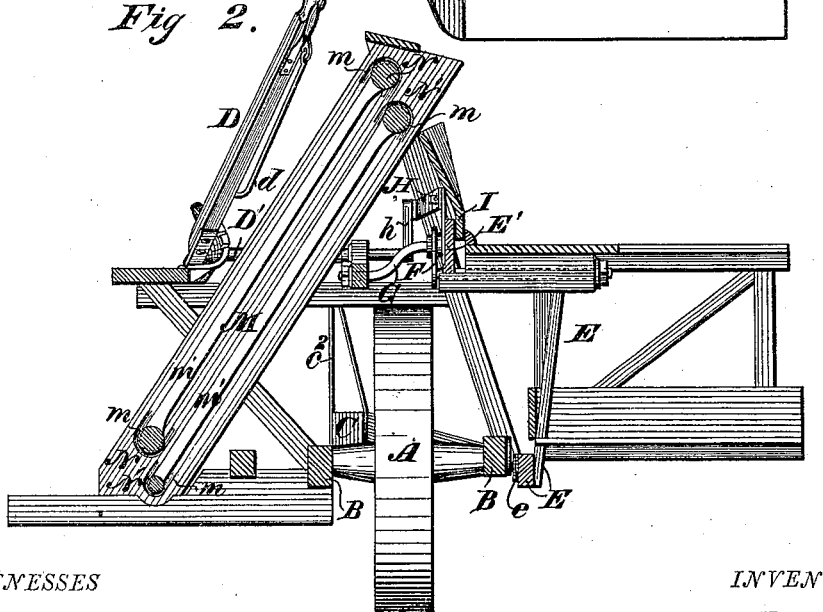

Figure 1 represents a plan view of so much of a hand-binding harvester as is necessary to illustrate the subject-matter herein claimed; Fig. 2, a section therethrough on the line $x\,x$ of Fig. 1; Fig. 3, a side elevation of the same, partly in section, on the line $y\,y$ of Fig. 1. Fig. 4 is a view in elevation from the opposite side of the machine. Fig. 5 is a face view of one of the guide-boards, showing the grooves surrounding the rolls; and Fig. 6, a section through the same in the line of the axis of the roller.

It will be unnecessary to describe the details of many parts of the machine, as their construction is familiar to all reaper-builders.

A driving-wheel, A, is mounted in suitable bearings in the main frame B, to which the tongue C is pivoted, at a point, $c$, about in line with the front edge of the driving-wheel. A lever, D, provided with the usual spring-stop $d$, operates a rock-shaft, D', mounted on the frame, and carries a crank-pin, $c^1$, which is connected with the tongue by an adjustable link or strap, $c^2$, thus enabling the driver to vary the height of cut by rocking the machine upon the axle of the driving-wheel in a well-known way. A frame, E, which supports the binders' stand and table, is pivoted upon the main frame, in or near the line of the main axle, at the point $e$, so as to allow the frame to rock slightly on said pivot. The upper portion of the binders' frame is connected with the main frame by means of slotted cranks F F', mounted on rock-shafts secured on the binder-frame, which cranks traverse fixed guide pins or studs G G' on the main frame. The binder-frame is rocked by means of a link, H, and crank $h$, connected with a rock-shaft of the lifting-lever. The portion E' of the binder-frame to which the link that rocks the frame is connected passes inside and interlocks with, and overlaps, the stationary shield I of the grain-receiver, or some corresponding portion of the main frame, and thus, in a great degree, relieves the cranks from the strain of supporting the weight of the upper portion of the binding-frame, and they can, consequently, turn freely as the frame rocks.

The elevating-apron used in the McCormick hand-binding harvester is made of canvas, with transverse strips of wood attached thereto at regular intervals, the ends of the strips extending as far as the edges of the canvas. In such aprons there is at times a tendency for one side of the apron to gain upon the other, thus causing the apron to rub against one side of its guide-board. This lateral deflection is readily counteracted while the apron is passing from one roller to the other, but is not so easily done when a slat is passing around the roller, as the friction of the ends of the slat against the guide-board is greater at that moment.

I obviate this objection by forming grooves $m$ in the guide-boards M, so as to encircle the outer portions of the bearings of the rollers N N', which rollers, it will be observed, turn on pivots inserted in strips $m'$, projecting inwardly from the guide-board, over which strips the edges of the apron travel, to prevent sagging.

It results from the construction above described, that when the ends of the slats run into the grooves no friction is created at that point, but the belt is straightened by the action of those portions of the guide-board between the rollers acting on the flat or straight portion of the elevating-apron, so that any deflection of the belt in passing around the rollers is compensated by the time the slats have passed around them.

The grooves are, by preference, made deeper from the outer to the inner point, so as gradually to merge into the line of the guide-board.

Practical experience has demonstrated this to be a useful improvement.

I claim as my invention—

1. The rocking slotted cranks, constructed and operating substantially as set forth, in combination with the binders' frame and its rocking lever.

2. The combination, substantially as hereinbefore set forth, of the main frame, the binders' frame, pivoted thereon, the cross-bar E', interlocking with, and overlapping, the fixed shield, the grain-receptacle, and the slotted rocking cranks.

3. The guide-board grooves in the elevator-frame, said grooves surrounding the end portions of the rollers, as and for the purpose described.

In testimony whereof I have hereunto subscribed my name.

WM. R. BAKER.

Witnesses:
JOHN V. A. HASBROOK,
DONALD McINTYRE.